United States Patent
Wolfe et al.

(10) Patent No.: US 9,022,265 B2
(45) Date of Patent: May 5, 2015

(54) BICYCLE RACK INSTALLABLE IN A PICKUP TRUCK BED OR TRAILER

(71) Applicants: Daniel Glen Wolfe, Highland, UT (US); Russell Gatenby, American Fork, UT (US)

(72) Inventors: Daniel Glen Wolfe, Highland, UT (US); Russell Gatenby, American Fork, UT (US)

(*) Notice: Subject to any disclaimer, the term of this patent is extended or adjusted under 35 U.S.C. 154(b) by 48 days.

(21) Appl. No.: 14/031,037

(22) Filed: Sep. 18, 2013

(65) Prior Publication Data

US 2014/0183237 A1 Jul. 3, 2014

Related U.S. Application Data

(60) Provisional application No. 61/744,045, filed on Sep. 18, 2012.

(51) Int. Cl.
*B60R 9/10* (2006.01)
*B60P 3/077* (2006.01)

(52) U.S. Cl.
CPC . *B60R 9/10* (2013.01); *B60P 3/077* (2013.01); *Y10S 224/924* (2013.01)

(58) Field of Classification Search
USPC ......... 224/403, 405, 924, 402, 500, 523, 533, 224/536, 537, 324; 410/3; 211/19, 20, 22
See application file for complete search history.

(56) References Cited

U.S. PATENT DOCUMENTS

| | | | | |
|---|---|---|---|---|
| 5,092,504 | A | * | 3/1992 | Hannes et al. ................. 224/403 |
| 5,127,564 | A | * | 7/1992 | Romero ....................... 224/403 |
| 5,611,472 | A | * | 3/1997 | Miller .......................... 224/403 |
| 5,862,966 | A | * | 1/1999 | Mehls .......................... 224/504 |
| 5,988,403 | A | * | 11/1999 | Robideau ....................... 211/20 |
| 6,062,396 | A | * | 5/2000 | Eason .......................... 211/20 |
| 6,179,181 | B1 | * | 1/2001 | Johnson et al. .............. 224/405 |
| 6,834,786 | B2 | * | 12/2004 | Hansen ........................ 224/403 |
| 6,968,986 | B1 | * | 11/2005 | Lloyd et al. .................. 224/507 |
| 7,694,830 | B1 | * | 4/2010 | Larson .......................... 211/20 |
| 7,784,656 | B2 | * | 8/2010 | Morrill et al. ................. 224/504 |
| 8,113,398 | B2 | * | 2/2012 | Sautter et al. ................. 224/497 |
| 8,496,148 | B2 | * | 7/2013 | Farney ......................... 224/497 |
| 8,763,870 | B2 | * | 7/2014 | Davis .......................... 224/324 |
| 2006/0196906 | A1 | * | 9/2006 | Gibson ........................ 224/403 |
| 2013/0277404 | A1 | * | 10/2013 | Heininger ..................... 224/405 |
| 2014/0117062 | A1 | * | 5/2014 | Kraeuter et al. .............. 224/403 |

* cited by examiner

*Primary Examiner* — Justin Larson
(74) *Attorney, Agent, or Firm* — Angus C. Fox, III (57) ABSTRACT

An improved, simple rack for the secure transport of bicycles and small motorcycles in the bed of a pickup truck or trailer without clamping, strapping or dissasembly of the cycle, and with minimal obstruction of the load-carrying bed floor, has individual cycle wheel receptacles with both fixed and spring-loaded wheel clamping brackets, that are secured to at least one rack rail assembly that is secured to opposite sides of the truck or trailer bed. In order to secure a cycle in the rack, a front or rear wheel of the cycle is lifted up and pushed into the wheel receptacle between the fixed and spring-loaded wheel clamping brackets. In order to unload the cycle, the wheel is pushed against the spring-loaded wheel clamping bracket, thereby releasing the wheel from the fixed wheel clamping bracket, and is, then, pulled upwardly from the wheel receptacle.

20 Claims, 7 Drawing Sheets

BICYCLE RACK INSTALLABLE IN A PICKUP TRUCK BED OR TRAILER

FIELD OF THE INVENTION

This invention relates, generally, to devices for securing and carrying bicycles and other wheeled devices to an automobile, pickup truck, or other vehicle for transport and, more particularly, to racks for securing and carrying bicycles within the bed of a pickup truck, trailer, or similar transporting vehicle.

BACKGROUND OF THE INVENTION

Bicycles, motorcycles, and other wheeled recreational equipment are commonly transported in or on vehicles such as automobiles, pickup trucks, and trailers. Numerous racks and tie-down devices have been devised to secure these recreational vehicles during transport. Almost all of the prior-art carrying devices require clamping, strapping, or partial disassembly of a bicycle or recreational vehicle before it is transported. When such prior-art carrying devices are employed, considerable time and effort is required to load and unload bicycles and other such equipment. Many prior-art carrying devices have not been designed to specifically accommodate installation within pickup truck beds, and those that have been so designed typically obstruct the load-carrying floor of the bed even when bicycles are not being transported. Other carrying and transport devices do not securely grip the bicycle, thereby risking damage to a bicycle's frame, components, and paint if it is ejected from the carrying device when bumps in the road are encountered.

What is needed is a simple rack that may be mounted within the bed of a pickup truck, trailer, or other transport vehicle in such a way that it minimizes obstruction of the load-carrying bed floor of the pickup truck or trailer. Such a rack will also provide a secure method of carrying bicycles, as well as small motorcycles and motor scooters having wheels of varying size.

SUMMARY OF THE INVENTION

The present invention answers the heretofore expressed need for an improved, simple rack that is designed to carry bicycles, motor scooters and small motorcycles in the bed of a pickup truck or trailer with minimal obstruction of the load-carrying bed floor. The improved rack provides for secure transport of bicycles, motor scooters and small motorcycles without clamping, strapping, or disassembly of the cycle. Individual wheel receptacles having both fixed and spring-loaded wheel clamping brackets, are secured to at least one rack rail assembly that is secured to opposite sides of the truck or trailer bed. In order to secure a bicycle or small motorcycle to the rack, a front or rear wheel of the cycle is lifted up and pushed into the wheel receptacle between the fixed and spring-loaded wheel clamping brackets. In order to unload the cycle, the wheel is pushed against the spring-loaded wheel clamping bracket, thereby releasing the wheel from the fixed wheel clamping bracket, and is, then, pulled upwardly from the wheel receptacle. The unique design of the wheel receptacle has many advantages over other racks designed for installation within the bed of a pickup truck. Specifically, the design of the wheel receptacle accommodates various wheel diameters and wheel widths without adjustments, disassembly, or changes being made to either the rack or cycle. The design is so effective at retaining the retained wheel that the wheel will not come out of the wheel holder even on very rough roads or terrain. In fact, the wheel cannot be released by only pulling up on the wheel. The fixed and spring-loaded wheel clamping brackets grip the tire of the carried cycle even tighter with the application of more upward pressure. Only by, first, releasing the spring-loaded wheel clamping bracket can the wheel be released from the wheel holder. Another important feature of the cycle rack is the adjustability of the bracket assemblies that are secured to the bed rails, and to which the rack rail assemblies are secured. rack clamping system, which allows the same rack to be adjusted to fit and easily clamp to the side rails on the upper edges of a pickup truck bed or to the upper edges of the sides of an open trailer.

PREFERRED EMBODIMENT OF THE INVENTION

The improved bicycle rack installable in a pickup truck bed or trailer will now be described in detail with reference to drawing FIGS. 1 to 10. It should be understood that the drawings are not necessarily drawn to scale and intended to be merely illustrative of the invention.

Figure 1:
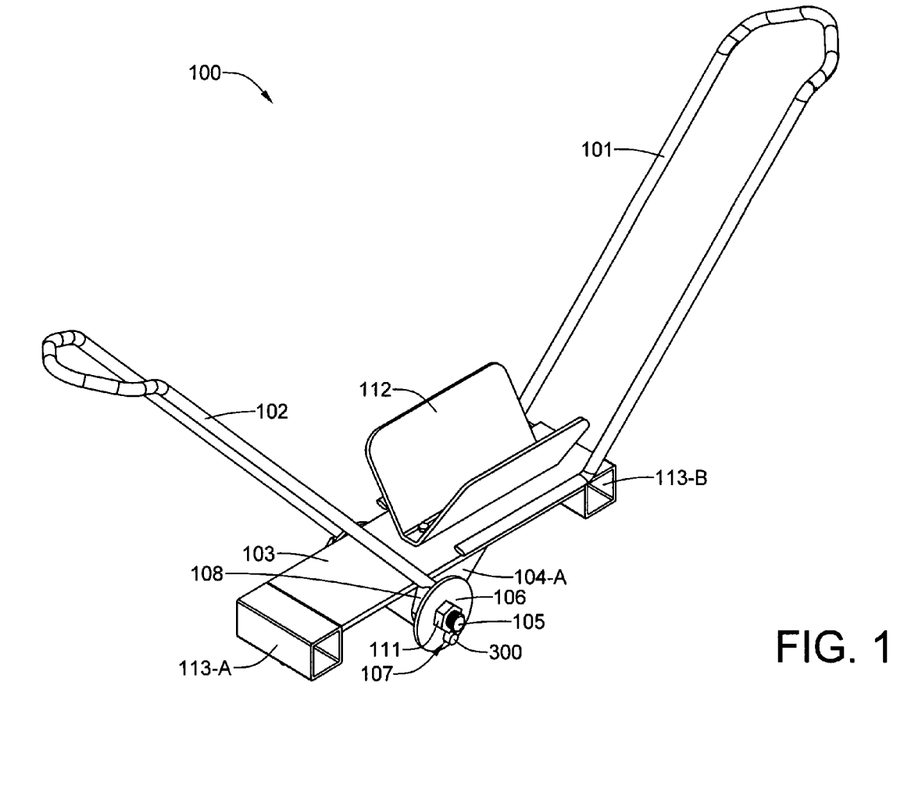
FIG. 1 is an isometric view of a spring-loaded wheel receptacle with the spring-loaded wheel clamping bracket in the foreground.
Figure 2:
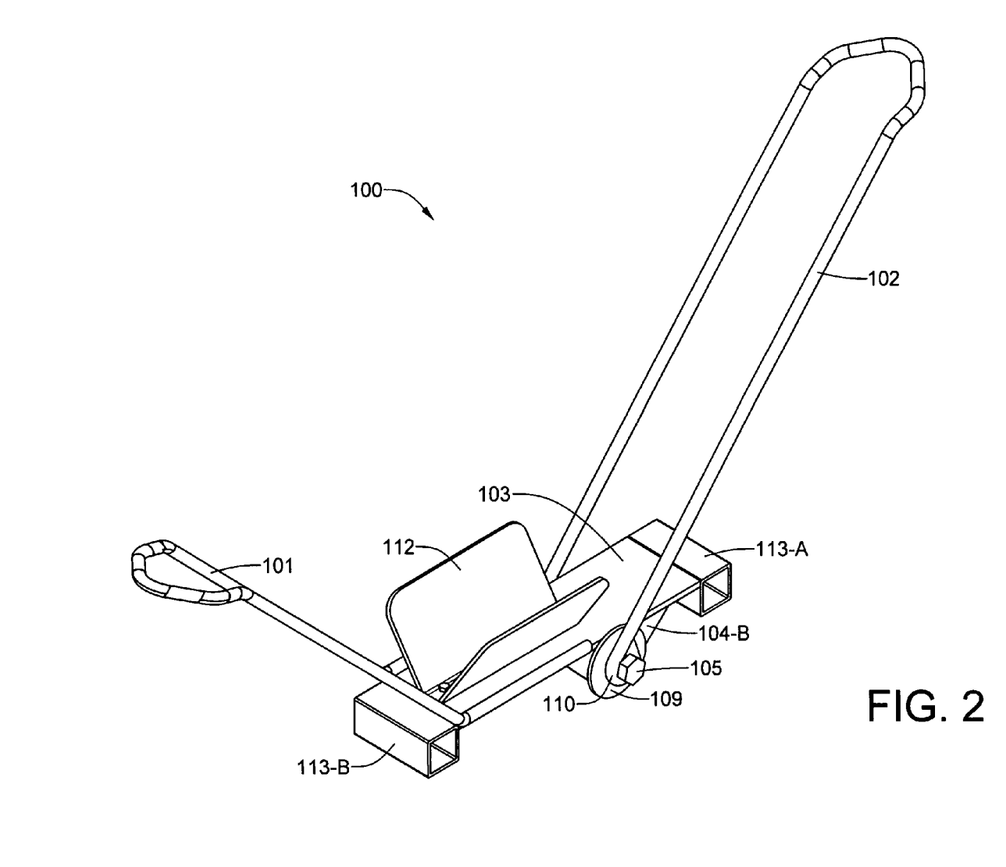
FIG. 2 is an isometric view of the spring-loaded wheel receptacle of FIG. 1, with the fixed wheel clamping bracket in the foreground.

Referring now to FIGS. 1 and 2, a single-wheel receptacle 100 has both a fixed wheel clamping bracket 101 having a first V-shaped clamp at a distal end thereof and a spring-loaded wheel clamping bracket 102 having a second V-shaped clamp at a distal end thereof. The single-wheel receptacle 100 has a base member 103 to which the fixed wheel clamping bracket 101 is rigidly secured. First and second ears 104A and 104B, respectively, are rigidly secured to the base member 103. Each ear 104-A and 104-B has an aperture through which a pivot bolt 105 passes. A first washer 106 having a central aperture and a peripheral aperture 107 is welded or brazed to a first looped end 108 of the spring-loaded wheel clamping bracket 102. The pivot bolt passes through a second washer 109, through a second looped end 110 of the spring-loaded wheel clamping bracket 102, through the second ear 104-B, through a coil spring 300 (best seen in FIGS. 3-6), through the first ear 104B, through the first looped end 108 of the spring-loaded clamping bracket 102, through the first washer 106, after which it is secured with a nut 111. It will be noticed that an end of the coil spring 300 passes through the peripheral aperture 107 of the first washer 106. An upwardly-facing V-channel bracket 112 is secured to the base member 103. The V-channel bracket 112, which is compatible with tires of most sizes, from narrow racing tires to large-cross section balloon tires, centers and secures the bottom of a secured bicycle wheel on the base member 103. First and second square-tube sections 113-A and 113-B are rigidly secured to opposite ends of the base member 103. These square-tube sections 113-A and 113-B are sized to slide onto a pair of spaced-apart telescoping square-tube rails (see FIG. 7). The location of each single-wheel receptacle 100 is adjustable on those rails.

Figure 3:
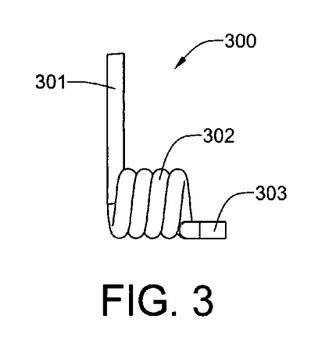
FIG. 3 is a first elevational view of the coil spring used to bias the spring-loaded wheel clamping bracket.
Figure 4:
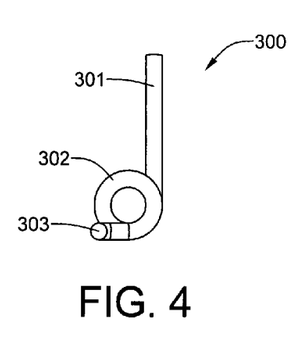
FIG. 4 is a second elevational view of the coil spring used to bias the spring-loaded wheel clamping bracket.
Figure 5:
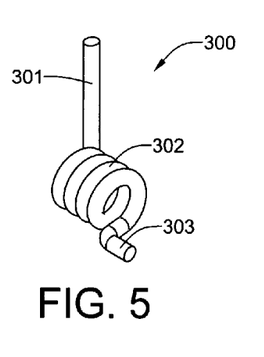
FIG. 5 is a isometric view of the coil spring used to bias the spring-loaded wheel clamping bracket.

Referring now to FIGS. 3, 4 and 5, the coil spring 300 used to bias the spring-loaded wheel clamping bracket against the wheel of a bicycle is shown in various views. It will be noted that a first end 301 extends directly from the coiled portion 302, while a second end 303 is bent on about a right angle, so that the second end 303 is generally parallel to the axis 304 of the coiled portion 302.

Figure 6:
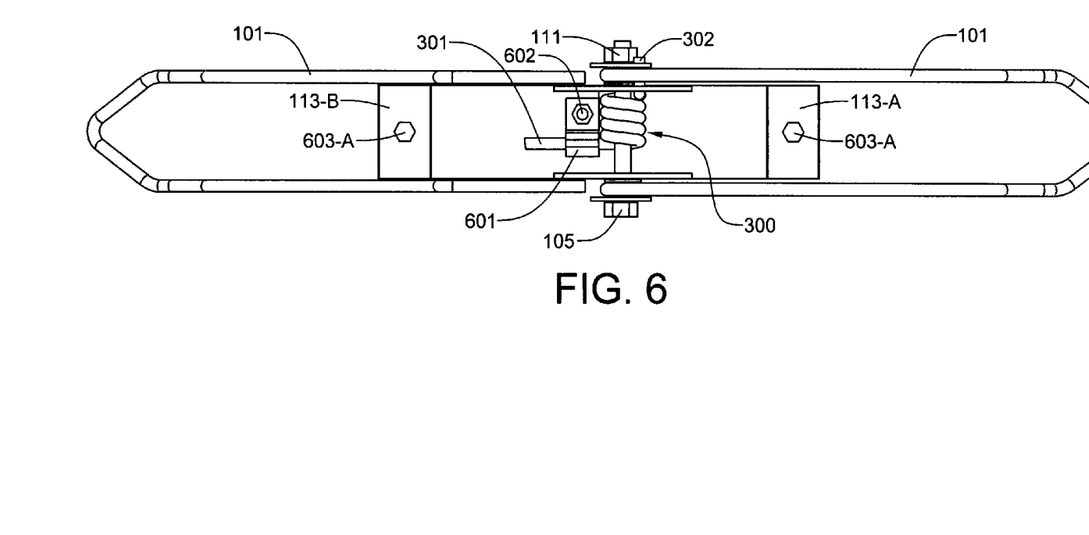
FIG. 6 is a bottom plan view of the spring-loaded wheel receptacle.

Referring now to FIG. 6, this bottom view of a single-wheel receptacle 100 shows how the coil spring 300 is secured to the base member 103. The first end 301 is secured directly to the base member by a securing bracket 601 and threaded fastener 602. The pivot bolt 105 passes through the coiled portion 302 of coil spring 300. Each of the ears 104A and 104B are visible in this view. It can be seen how the second end 303 of the coil spring 300 passes through the peripheral aperture 107 in the first washer 106. Thus, as the spring-loaded clamping bracket 102 is pushed down, the coil spring 300 stores energy that is released when the wheel clamping bracket 102 is released against the tire of a wheel that is retained in the single-wheel receptacle 100. Set bolts 603-A and 603-B secure the square-tube sections 113-A and 113-B, respectively, on the adjustable square-tube rails.

Figure 7:
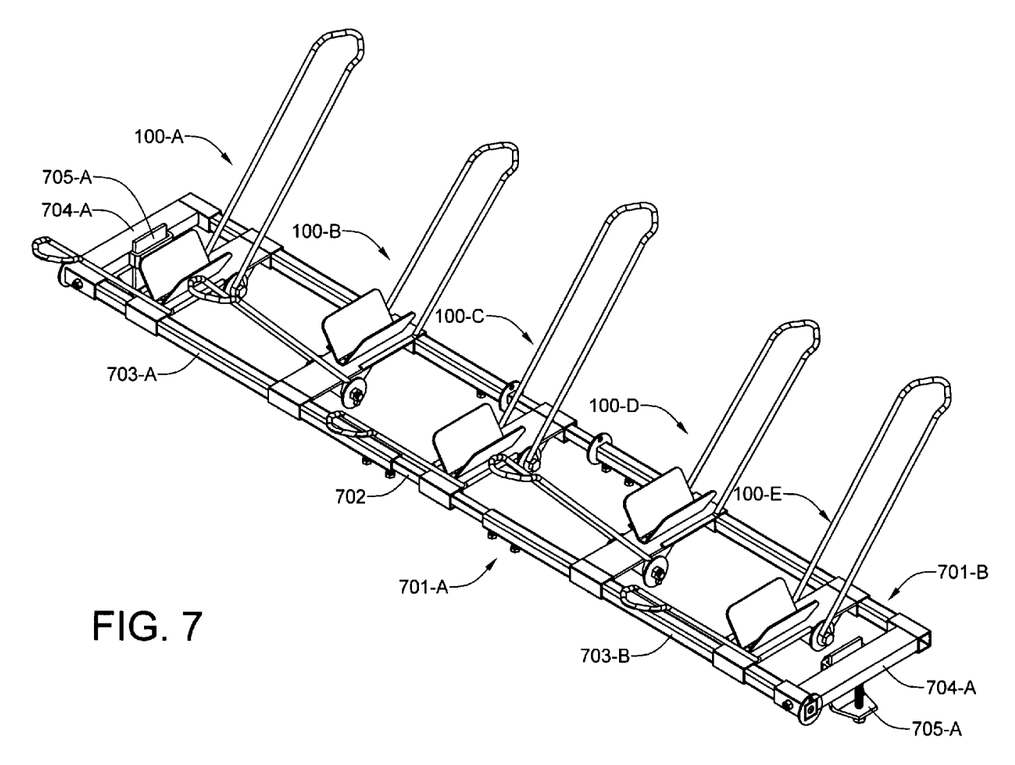
FIG. 7 is an isometric view of a five-wheel receptacle version of the bicycle rack.

Referring now to FIG. 7, a bike rack assembly 700, consisting of five single-wheel receptacles 100-A, 100-B, 100-C, 100-D, 100-E and 100-F secured to adjustable parallel spaced-apart rails 701-A and 701-B, is shown. Each of the spaced-apart rails 701-A and 701-B comprises a center section 702 and two outer section 703-A and 703B. Although each wheel receptacle 100 is reversed with respect to adjacent wheel receptacles 100, they may also be installed so that all are facing the same direction. At each end of the bike rack assembly 700, rails 701-A and 701-B are secured to a mounting bracket 704-A or 704-B. Each mounting bracket 704 (generally) can be mounted to the side rails of a pickup truck bed using the adjustable clamp 705-A or 705-B.

Figure 8:
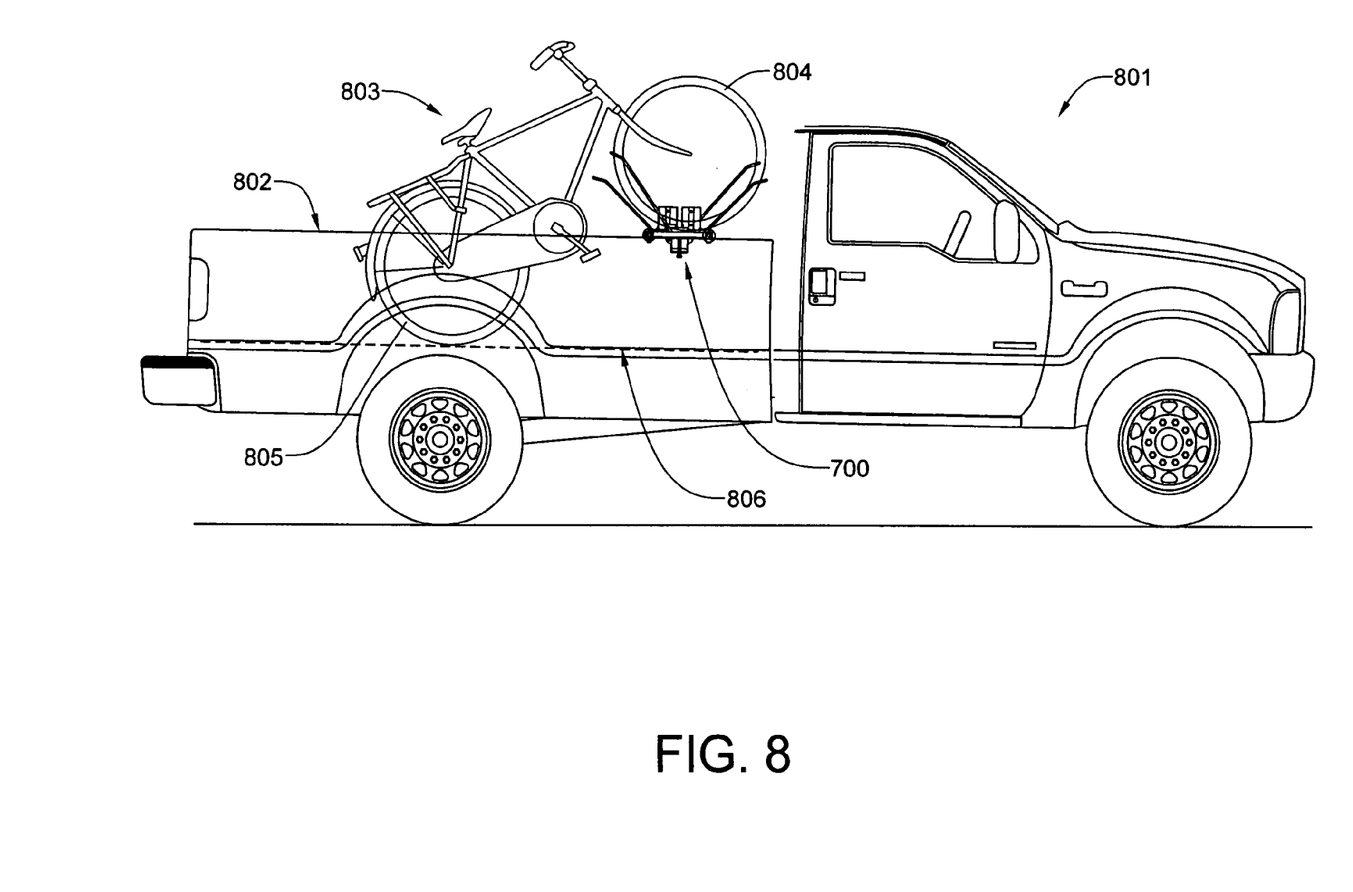
FIG. 8 is a side elevational view of a pickup truck having a bicycle rack according to one embodiment of the present invention installed in a forward position on the bed rails and having a bicycle set in and ready for transport, with the rear wheel resting on the floor of the bed.

Referring now to FIG. 8, a bike rack 700 in accordance with the present invention has been installed on the side rails of a pickup truck bed 802. A single bicycle 803 is shown with the front wheel 804 secured to the rack 700 and the rear wheel 805 resting on the floor 806 of the bed 802.

Figure 9:
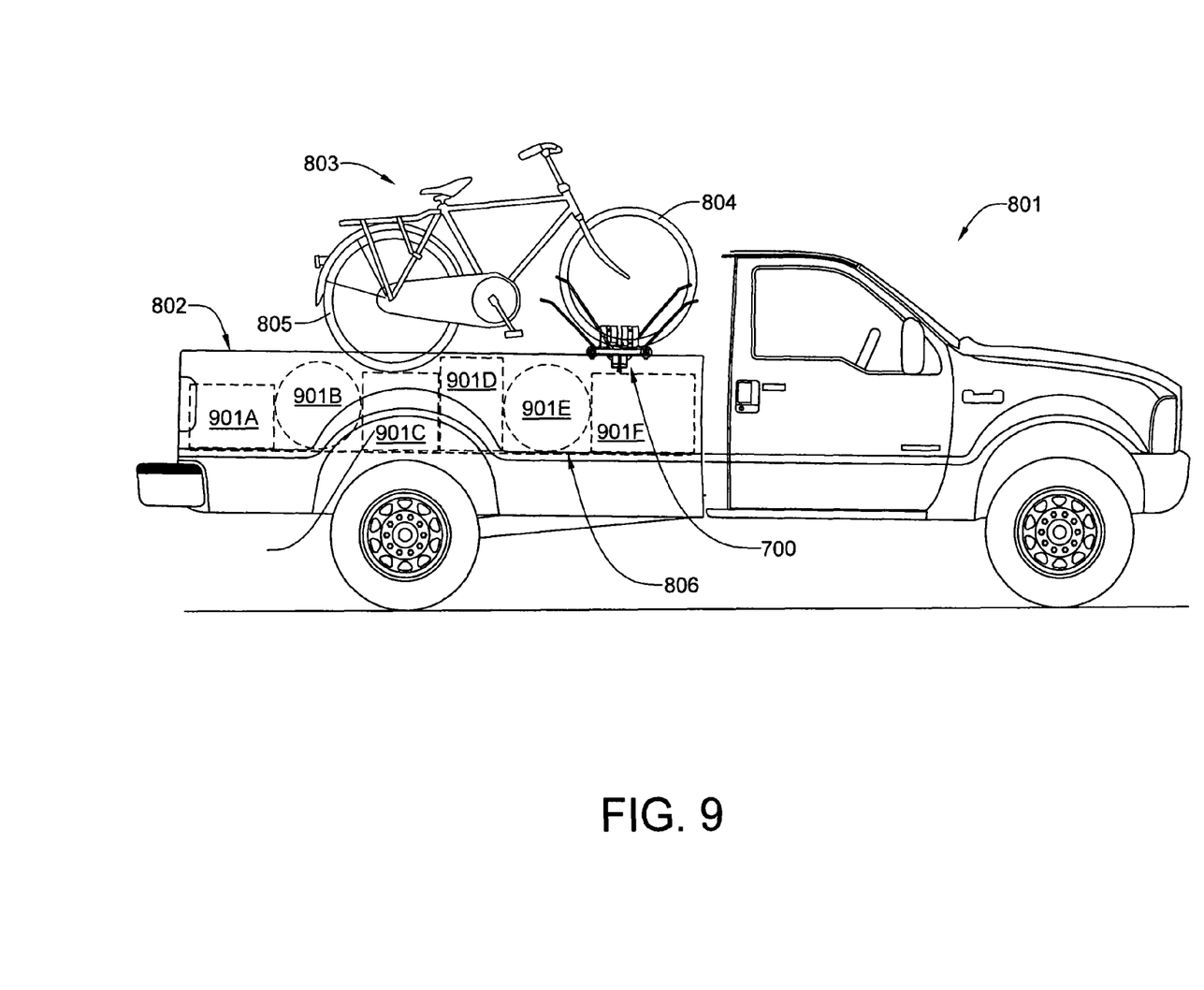
FIG. 9 is a side elevational view of a pickup truck having a bicycle rack according to one embodiment of the present invention installed in a forward position on the bed rails, having the bed loaded with gear, and with a bicycle set in the rack and ready for transport, with the rear wheel resting on top of the loaded gear.

Referring now to FIG. 9, the bike rack 700 in accordance with the present invention has been installed on the side rails of a pickup truck bed 802. The bed has been filled with pieces of cargo 901A-901F, which are resting on the floor of the bed 802. A single bicycle 803 is shown with the front wheel 804 secured to the rack 700 and the rear wheel 805 resting on the top of cargo piece 901C.

Figure 10:
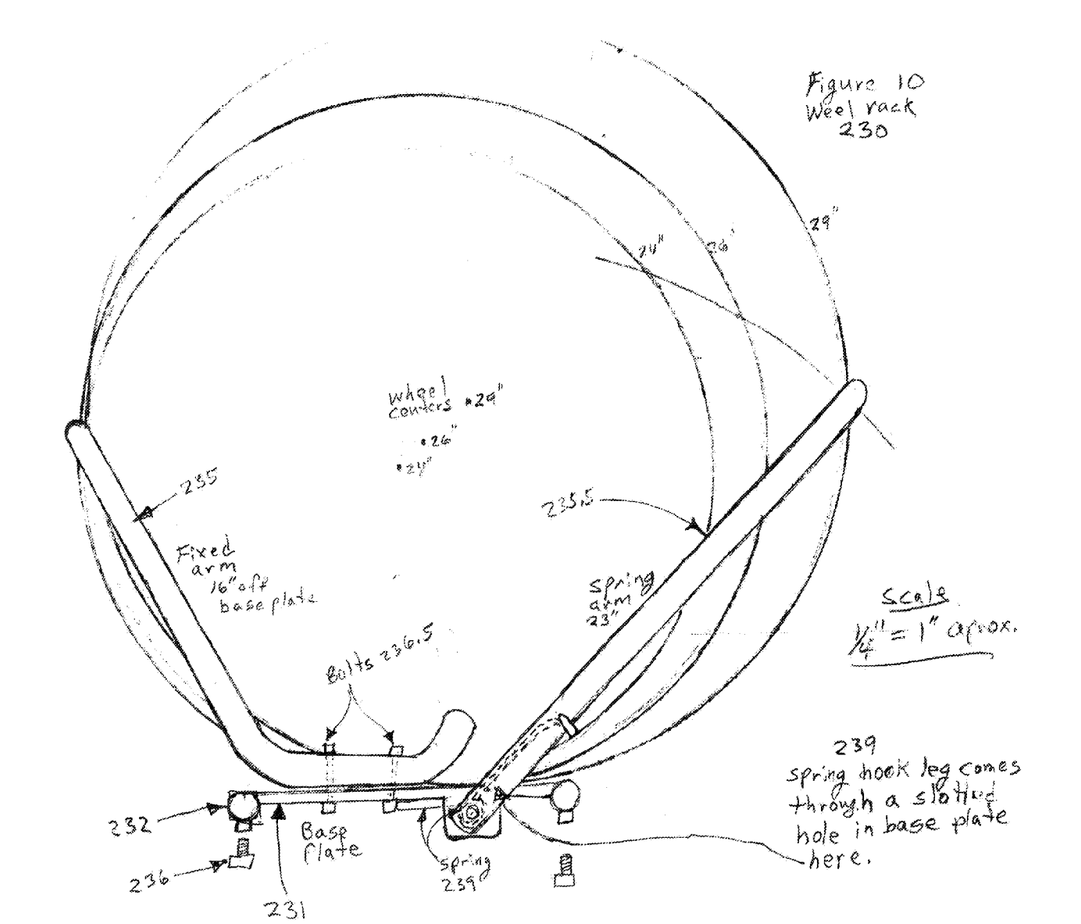
FIG. 10 is a top plan view of a pickup truck bed having the five-wheel receptacle version of the bicycle rack of FIG. 1 installed therein and having two bicycles set in and ready for transport.

Referring now to FIG. 10, the five-wheel receptacle version of the bicycle rack 700 of FIG. 7 has been installed in the bed 802 of a pickup. The front wheel 804 of each of two bicycles 803 have been set in a single-wheel receptacle 100, rendering the bicycles 803 ready for transport.

Although only a single embodiment of the improved cycle rack has been shown and described, it will be obvious to those having ordinary skill in the art that changes and modifications may be made thereto without departing from the scope and the spirit of the invention as are hereinafter claimed.

What is claimed is:

1. A bicycle transport rack securable to upper portions of opposed side walls of a cargo bed, said rack comprising:
   at least one rack rail assembly securable between said opposed upper portions; and
   at least one wheel receptacle having
      a base member securable to said at least one rack rail assembly;
      an upwardly-facing V-channel bracket, secured to the base member, which transversely locates and grips a lower edge of a cycle wheel;
      a first wheel clamping bracket rigidly affixed to said base member, said first wheel clamping bracket having a first V-shaped clamp at a distal end thereof which grips a transversely located cycle wheel on its circumference at a first distance from said V-channel bracket; and
      a second wheel clamping bracket pivotally affixed to said base member and spring biased toward said first wheel clamping bracket, said second wheel clamping bracket having a second V-shaped clamp at a distal end thereof which grips a transversely located cycle wheel on its circumference at a second distance from said V-channel bracket and at a third distance from said first V-shaped clamp; and
   wherein a cycle wheel secured by said V-channel bracket and said first and second wheel clamping brackets cannot be removed from said at least one wheel receptacle without, first, pivoting said second wheel clamping bracket away from said first wheel clamping bracket.

2. The bicycle transport rack of claim 1, which further comprises a pair of bracket assemblies, each of which is securable to one of the opposed side walls, each bracket assembly comprising:
   an upper portion which rests on an upper edge of one of the side walls, and to which an end of said at least one rack rail assembly is securable; and
   a lower portion, secured to said upper portion, which clamps to a rail channel beneath the upper edge of the same side wall.

3. The bicycle transport rack of claim 1, wherein said first wheel clamping bracket consists of a looped steel rod having its ends rigidly secured to said base member.

4. The bicycle transport rack of claim 1, wherein said second wheel clamping bracket consists of a looped steel rod having its ends pivotally secured to opposite sides of said base member.

5. The bicycle transport rack of claim 4, wherein the ends of said second wheel clamping bracket each have coaxial eyes, and the base member has a pair of downward projecting ears equipped with coaxial apertures, and a bolt passes through the coaxial eyes and coaxial apertures and is secured with a nut, thereby securing said second wheel clamping bracket to said base member.

6. The bicycle transport rack of claim 5, wherein said bolt passes through a coil spring that provides biasing of said second wheel clamping bracket toward said first wheel clamping bracket.

7. The bicycle transport rack of claim 1, wherein said at least one rack rail assembly comprises a pair of horizontally spaced-apart, parallel rack rail assemblies, to which the base member of said at least one wheel receptacle is secured.

8. The bicycle transport rack of claim 1, wherein said at least one rack rail assembly is telescoping so as to accommodate cargo beds of varying widths.

9. A bicycle transport rack securable to parallel opposed side rails of a pickup cargo bed, said rack comprising:
at least one rack rail assembly securable between said opposed rails; and
at least one wheel receptacle having
a base member securable to said at least one rack rail assembly;
an upwardly-facing bracket, secured to the base member, which grips a lower edge of a cycle wheel;
a first wheel clamping bracket rigidly affixed to said base member, said first wheel clamping bracket having a first V-shaped clamp at a distal end thereof which grips a cycle wheel positioned in the wheel receptacle on its circumference at a first distance from said upwardly-facing bracket; and
a second wheel clamping bracket pivotally affixed to said base member and spring biased toward said first wheel clamping bracket, said second wheel clamping bracket having a second V-shaped clamp at a distal end thereof which grips a cycle wheel positioned in the wheel receptacle on its circumference at a second distance from said V-channel bracket and at a third distance from said first V-shaped clamp.

10. The bicycle transport rack of claim 9, which further comprises a pair of bracket assemblies, each of which is securable to one of the parallel, opposed side rails of the pickup cargo bed, each bracket assembly having a clamping mechanism that secures it to one of the side rails.

11. The bicycle transport rack of claim 9, wherein said at least one wheel receptacle is slidably securable to said at least one rack rail assembly at any position along its length.

12. The bicycle transport rack of claim 9, wherein said first wheel clamping bracket consists of a steel rod, with said first V-shaped clamp forming a switchback at the center thereof so that opposite ends of the rod can be rigidly secured to said base member.

13. The bicycle transport rack of claim 9, wherein said second wheel clamping bracket consists of a steel rod, with said second V-shaped clamp forming a switchback at the center thereof so that opposite ends of the rod can be pivotally secured to opposite sides of said base member.

14. The bicycle transport rack of claim 9, wherein:
each end of said second wheel clamping bracket is equipped with an eye that is coaxial with an eye on the other end;
the base member has a pair of downward projecting ears equipped with coaxial apertures; and
a bolt passes through the coaxial eyes and coaxial apertures and is secured with a nut, thereby securing said second wheel clamping bracket to said base member.

15. The bicycle transport rack of claim 14, wherein said bolt passes through a coil spring that provides biasing of said second wheel clamping bracket toward said first wheel clamping bracket.

16. The bicycle transport rack of claim 9, wherein said at least one rack rail assembly comprises a pair of horizontally spaced-apart, parallel rack rail assemblies, to which the base member of said at least one wheel receptacle is secured.

17. The bicycle transport rack of claim 9, wherein said at least one rack rail assembly is telescoping so as to accommodate cargo beds of varying widths.

18. A bicycle transport rack securable to parallel opposed side rails of a pickup cargo bed, said rack comprising:
a pair of telescoping, horizontally spaced-apart, parallel rack rail assemblies securable between said opposed rails; and
at least one wheel receptacle having
a base member securable to said pair of parallel rack rail assemblies;
an upwardly-facing bracket, secured to the base member, which grips a lower edge of a cycle wheel;
a first wheel clamping bracket consisting of a first steel rod having a first V-shaped clamp at a switchback bend in the center thereof, said first wheel clamping bracket being bilaterally symmetrical and having spaced-apart ends that are rigidly affixed to said base member, said first V-shaped clamp being located at a distal end of said first wheel clamping bracket such that it can grip a cycle wheel positioned in the wheel receptacle on its circumference at a first distance from said upwardly-facing bracket; and
a second wheel clamping bracket consisting of a second steel rod having a second V-shaped clamp at a switchback bend in the center thereof, said second wheel clamping bracket being bilaterally symmetrical and pivotally affixed to said base member and spring biased toward said first wheel clamping bracket, said second V-shaped clamp being located at a distal end of said second wheel clamping bracket such that can grip a cycle wheel positioned in the wheel receptacle on its circumference at a second distance from said V-channel bracket and at a third distance from said first V-shaped clamp.

19. The bicycle transport rack of claim 18, wherein:
each end of said second wheel clamping bracket is equipped with an eye that is coaxial with an eye on the other end thereof;
the base member has a pair of downward projecting ears equipped with coaxial apertures; and
a bolt passes through the coaxial eyes and coaxial apertures and is secured with a nut, thereby pivotally securing said second wheel clamping bracket to said base member.

20. The bicycle transport rack of claim 19, wherein said bolt passes through a coil spring that provides biasing of said second wheel clamping bracket toward said first wheel clamping bracket.

* * * * *